United States Patent [19]
Tye

[11] 3,848,553
[45] Nov. 19, 1974

[54] AGRICULTURAL DRILL
[76] Inventor: John M. Tye, P.O. Box 218, Lockney, Tex. 79241
[22] Filed: Apr. 24, 1972
[21] Appl. No.: 247,120

[52] U.S. Cl. .................................. 111/87, 172/646
[51] Int. Cl. ............................................. A01c 5/00
[58] Field of Search .............. 111/69, 59, 1, 85, 86, 111/87, 741; 172/645, 646

[56] References Cited
UNITED STATES PATENTS
1,591,414  7/1926  Brenneis ........................ 172/741 X
3,568,613  3/1971  Lange ................................... 111/86
3,611,956  10/1971  Moore et al. ..................... 111/87 X FOREIGN PATENTS OR APPLICATIONS
1,032,847  7/1953  France .............................. 172/646

Primary Examiner—Stephen C. Pellegrino
Attorney, Agent, or Firm—Wendell Coffee

[57] ABSTRACT

A grain drill has the planter disc pivot arms pivoted to a bracket. The bracket pivots are above or below a sloted bar whereby the planter discs may be adjusted longitudinally of the frame. The pivot arms may be raised or lowered by reversing the brackets.

The seeder housings are clamped along a longitudinal slot in the bottom of the seed box so the housing may be adjusted to the position of the planter disc. The seeder discs are clamped to a square shaft so they can be adjusted to the position of the housing.

7 Claims, 9 Drawing Figures

3,848,553

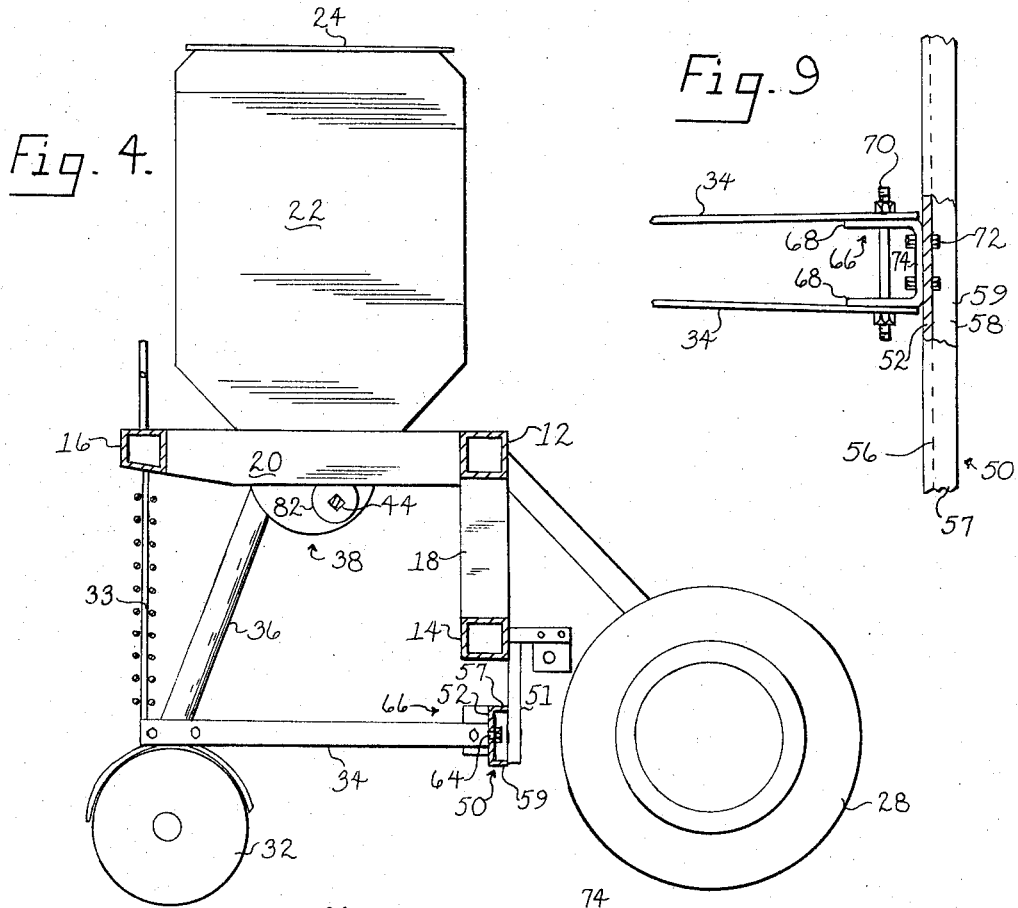
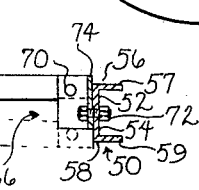
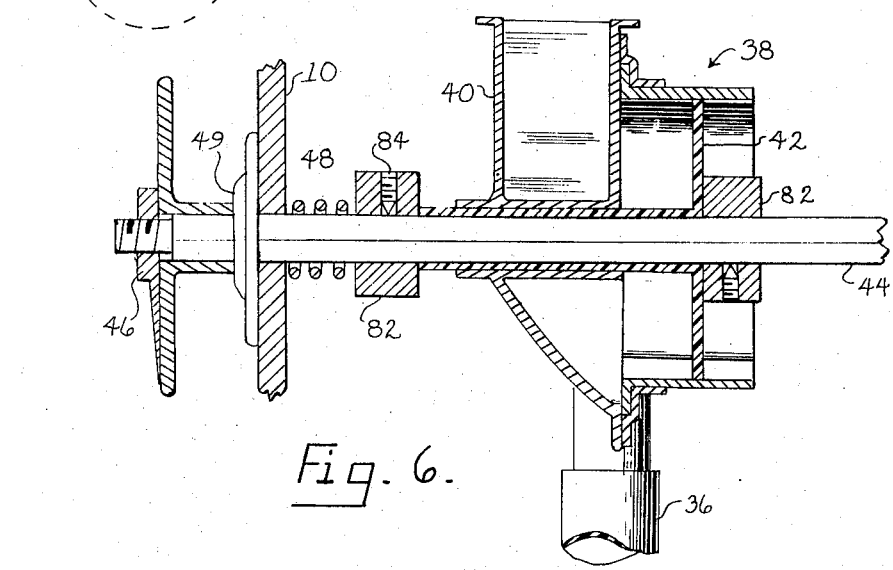

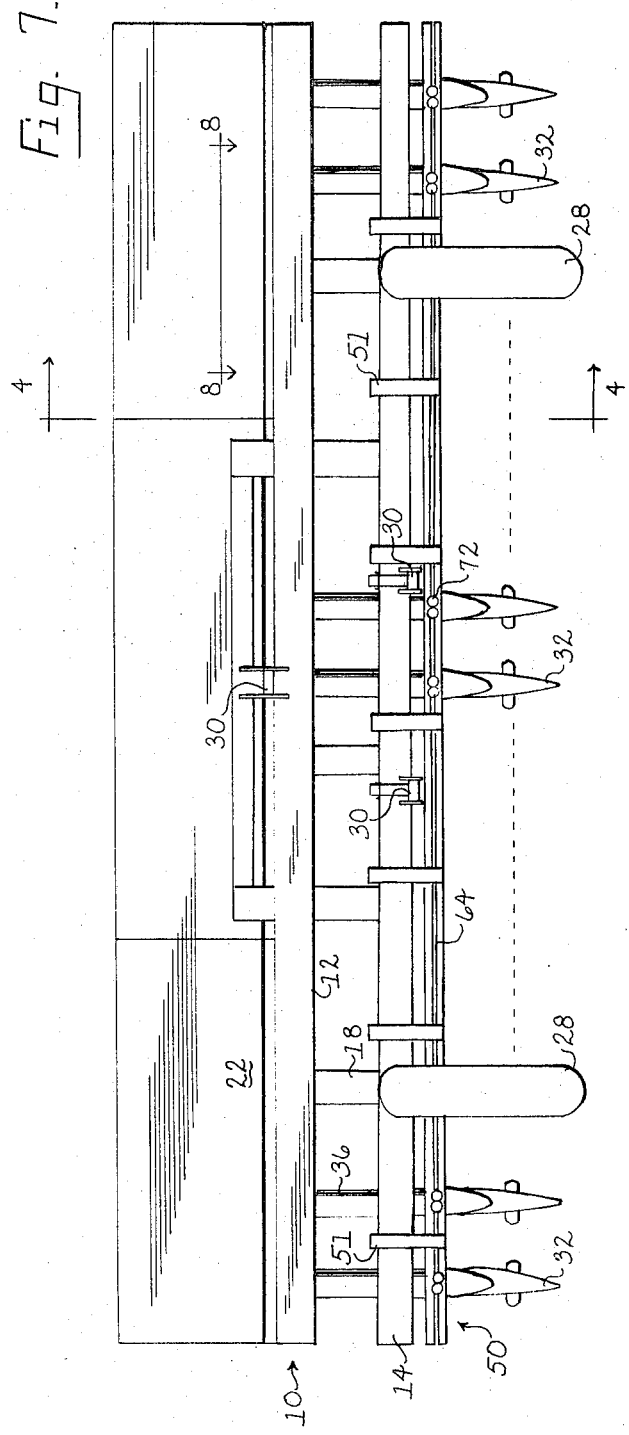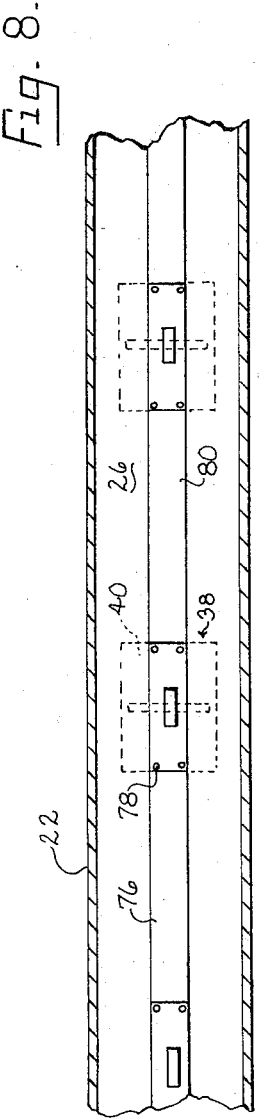

AGRICULTURAL DRILL

BACKGROUND OF THE INVENTION

1. Field of the Invention

This invention relates to agricultural planters of the grain drill type.

2. Description of the Prior Art.

Agricultural planters of the grain drill type are common, well known commercially available agricultural implements.

By grain drill type, I mean the type planter wherein there is an elongated seed box with a plurality of seeders in the bottom thereof, each seeder having housing attached to the bottom of the seed box. Each seeder has a seeder disc which is attached to a rotable shaft. The rate of seeding is adjusted by moving the shaft and thus the discs so there is a greater or lesser clearance between the disc and the housing.

Traditionally, grain drills are made completely non-adjustable. I.e., they are made to drop seeds in drills in fixed row-width spacings, e.g., 6⅔ inches, or 8 inches, or 10 inches. If a a farmer desired to plant part of his crop on ten inch spacing, traditionally he had to purchase two separate grain drills.

Also, all of the planter discs were designed to operate upon the same level. Therefore, if the farmer desired to plant upon furrowed ground so that some planter discs were higher than the others, his only solution was to adjust his drill height halfway between and have some of the planter discs at too high of an angle and other discs at too low of an angle.

Previously, I have manufactured and sold grain drills wherein the planter discs' height was adjustable. Examples of this are shown in parts catalogs and advertisement brochures which I have publicly distributed.

A BRIEF DESCRIPTION OF THE DRAWING

FIG. 4 is a sectional view looking from the right of my drill taken substantially on line 4—4 of FIG. 7.

FIG. 5 is a sectional view showing a detail of the planter disc and the arm in the alternative positions.

FIG. 6 is a sectional view of the seeder housings and discs, also a modified form of nut 46 and sprocket.

FIG. 7 is a front elevational view of a drill with some parts not shown for clarity.

FIG. 8 is a sectional view taken substantially on line 8—8 of FIG. 7 showing the attachment of the seeder housing.

FIG. 9 is a top plan view, partially in section, of the bracket attachment to the sloted bar.

SUMMARY OF THE INVENTION

1. New and Different Function

Figure 1:
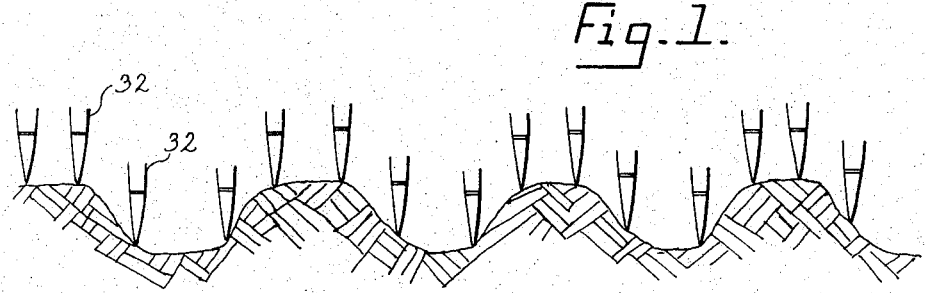
FIG. 1 is a schematic representation of planter discs according to this invention planting upon furrowed or corrugated land with four rows to the furrow, two on top of the bed and two down in the furrow.
Figure 2:
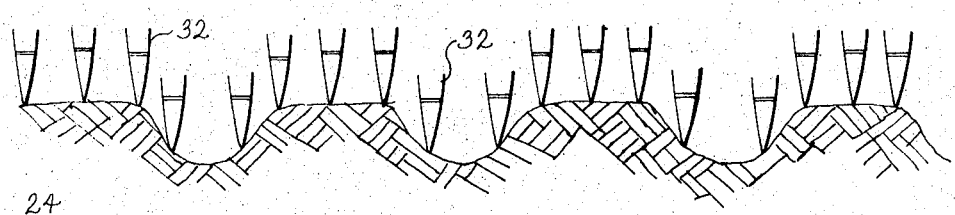
FIG. 2 is a schematic representation of planter discs according to this invention planting furrowed ground with five rows to the furrow, three rows upon the bed and two within the furrow.
Figure 3:
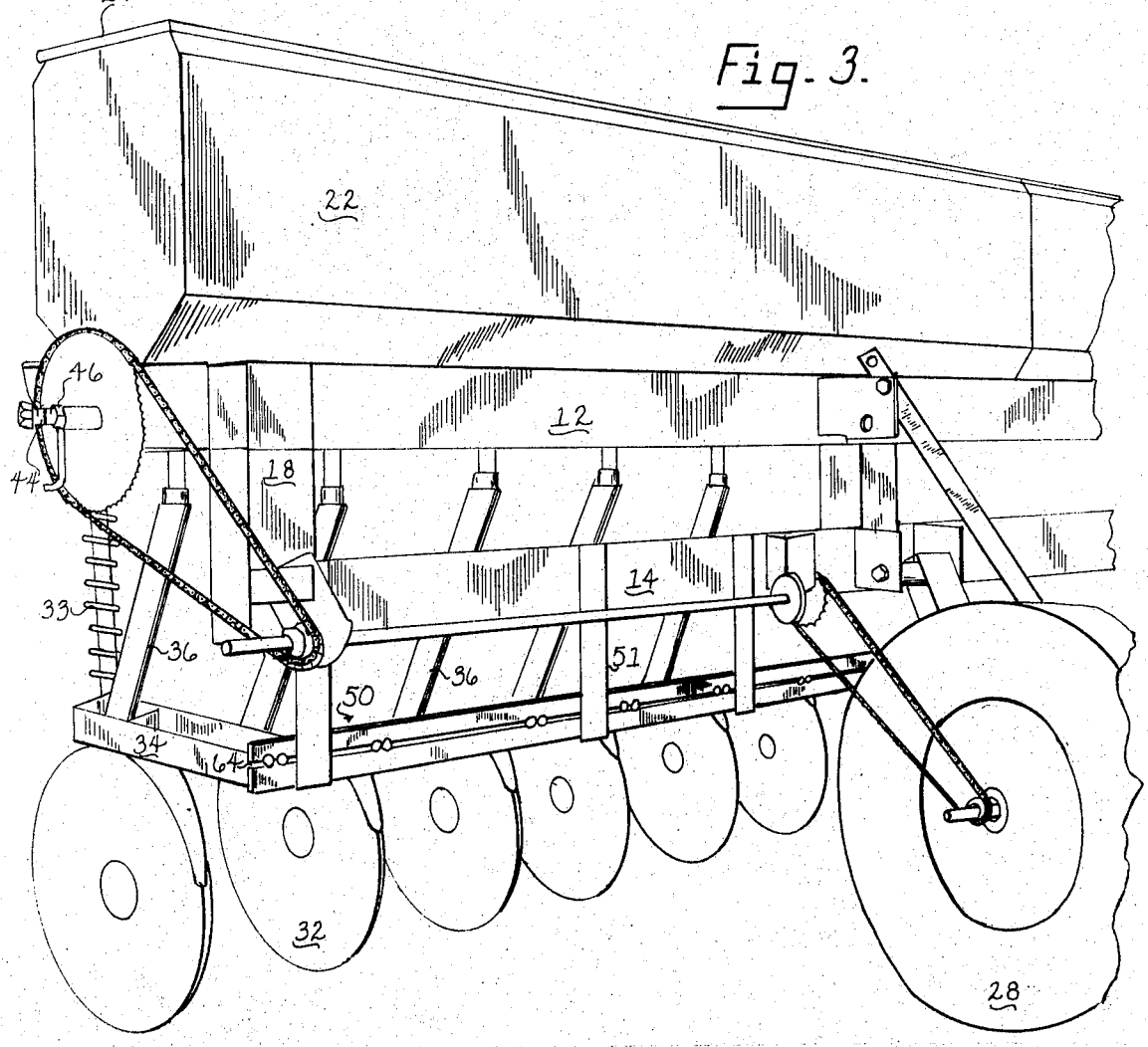
FIG. 3 is a perspective view of the front right side of a drill according to my invention.

Referring particularly to FIG. 1 wherein four rows of grain are drilled and assuming that the furrows are on a 40-inch spacing, the planting discs are set at 10-inch intervals with two discs up and two discs down. Then, referring to FIG. 2, if these are 40-inch furrows, the discs are set at 8-inch spacings with three discs up and two discs down. As stated above, with conventional equipment, this would be impossible and it would be necessary to use one 10-inch drill and one 8-inch drill and then the discs on the top of the bed would be at a high angle while the discs at the bottom of the bed would be at a low angle.

According to what I have previously manufactured and sold, I have made provisions for having some of the discs high and some of the discs low; however, the previous models did not completely solve the spacing problem. E.g., if the row spacing were 38 inches instead of 40 inches, it may be seen that the discs in FIG. 1 would be at 9.5 inches and in FIG. 2, the discs would be at 7.6 inches spacing. Of course those skilled in the art will recognize that sometimes it would be desirable to have two rows on top, e.g., with 10-inch spacing therebetween and then to skip 30 inches and have two more rows on top of the bed at 10-inch spacing. Often grains, such as milo maize, are planted in such fashion.

I have provided an adjustable drill for any row spacing desired. I have accomplished this by having each disc attached to a bracket. The bracket has a pivot which is off-center from its attachment bolt. Therefore, if the bracket is reversed or turned upside down, the pivot can be either raised or lowered, thereby making the disc either high or low. Also, the brackets are attached to a sloted bar so they can be adjusted and the discs spaced at any spacing desired by the farmer.

By having the spacings of the planting discs adjustable, it is also desirable to have the seeders adjustable. Normally, the discs of the seeders are attached by cotters in holes which are precision drilled in the shaft. Then the housing is placed on the seed box in a fixed location; thus, on normal procedures if the housing is moved, it is necessary to have the holes in the shaft drilled for the cotters to be placed. Although it might be possible to drill the shaft at two or three selections, it would be impossible to have it adjustable for any desired spacing desired by the farmer. I have solved that problem by having both the housing and the discs positioned anywhere along the seed box. Positioning of the housing presents no particular difficulty because they can be clamped in place anywhere along a slot in the bottom of the seed box and the spaces between the housings filled up.

I prefer to drive the discs by a square shaft. The positioned disc is clamped to the shaft by collars with set screws. It would be possible to use any shaped shaft and clamp the collars into position with something resembling a chuck. However, I prefer a non-round shaft.

2. Objects of this Invention

An object of this invention is to provide a grain drill having adjustable spacing between the planter discs and therefore, between the seeders.

Another object is to provide a grain drill wherein the seeder discs may be adjusted to different heights to facilitate planting on furrowed ground.

Another object is to have the height of the planting discs adjustable.

Further objects are to achieve the above with a device that is sturdy, compact, durable, lightweight, simple, safe, efficient, versatile, and reliable, yet inexpensive and easy to manufacture, assemble, adjust, operate, and maintain.

Still further objects are to achieve the above with a method that is versatile, rapid, efficient, dependable, and inexpensive, and does not require skilled people to assemble, adjust, operate, and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENT

As seen in the drawings, the main structural support for the machine according to this invention is frame 10. The frame in front elevation (FIG. 7) is generally rectangular with a horizontal, longitudinally extending top beam 12 and a lower front beam 14. Back beam 16 is on the same elevation as the top beam 12. The three beams 12, 14, and 16, are horizontal, parallel and extend substantially the entire width of the machine. The top beam 12 is connected to the lower beam by cross members 18 and the top beam 12 is also connected to the back beam 16 by cross members 20.

The specific machine described is a six-row model wherein the beams are about 22 feet in length. Three seed boxes 22 are mounted upon the frame 10. Basically the seed boxes 22 are rectangular in cross section having lid 24 and bottom 26. The bottom 26 is mounted and attached to the cross members 20.

Gauge wheels 28 are adjustably clamped to the front portion of the frame 10. Hitch means 30 which forms means for attaching the frame to a draft vehicle (not shown) also are adjustably clamped to the front of the frame 10.

Planter discs 32 are attached by pivot arms 34 to the frame 10. Flexible chutes 36 extend from seeders 38 in the bottom 26 of the seed boxes 22 to the planter disc 32. The seeders 38 are well known and commercially on the market and are means for metering and dispensing seed.

The seeders 38 each include a housing 40 and a disc 42 rotating within the housing. The discs 42 are mounted upon shaft 44. The shaft 44 is rotated by conventional means, e.g., a chain running from a sprocket upon a ground engaging wheel 28. Normally, it is more desirable to have two shafts 44, one a right hand shaft and the other a left hand shaft and having the shafts extending only half the length of the total machine. The shafts 44 are movable and adjustable longutudinally. This adjustment is conventionally obtained by nut 46 threaded upon one end of shaft 44 and spring 48 bearing between bearing 49 fixed to the frame 10 and a fixed item upon the shaft 44.

Basically, the machine as described to this point is well known and is commercially on the market.

Inasmuch as the basic machine has been known for many years and commercially on the market, construction has not been described in great detail. I.e., in the planter discs 32 themselves, there are a great number of parts, bearings, etc., as well known in the art. Also, the planter discs 32 are pressed down by a spring arrangement 33 and is well known in the art. Also, there is certain auxillary equipment such as press wheels and the like to follow along behind the planter discs to properly press the planted seed into the ground, cover it and press the dirt over the seed. However, inasmuch as this invention is not directly concerned with these parts and due to the fact these parts have been commercially on the market for so many years, they have not been illustrated or described for simplicity and clarity.

However, to make the spacing between the planter discs 32 adjustable, the desirability of which is outlined above, additional bar 50 is attached to the frame 10 immediately below the lower bar 14 by hangers 51. The bar 50 is in the form of two angle irons 56 and 58, which are mounted with the top angle iron 56 having one leg 57 horizontal and the other leg 52 vertically depending therefrom. The other angle iron 58 has one vertical leg 54 in the same plane as the vertical leg 52 of the top angle iron 56 and the second leg 59 horizontal. The two vertical legs are spaced apart, forming slot 64 therebetween. The bar 50 itself is horizontal and parallel to the beams 12, 14, and 16, and extends substantially the full width of the frame. The slot 64 likewise is horizontal, parallel and extends substantially the full length of the machine.

Each planter disc 32 is attached by the pivot arms 34 to bracket 66. The brackets 66 when viewed from above (FIG. 9) are basically U-shaped having two rearwardly extending ears 68. Each of these ears 68 have a hole, the two holes of which are aligned. Pivot bolts 70 extend through the ears 68 and through the pivot arms 34. Thereby, the pivot arms 34 and thus the planter discs 32 are pivoted to the brackets 66. Clamp bolts 72 extend through holes in the bight 74 of the bracket 66 and through the slot 64 in the bar 50.

The pivot holes in the ears 68 are at a different elevation than the holes through the bight 74. The bracket 66 is reversible. Therefore, if the bracket 66 is mounted with the pivot holes up, the planter discs 32 are mounted to operate at a higher elevation (shown in full line in FIG. 5) than if the bracket 66 is reversed and the pivot holes in the ears 68 are at an elevation below the slot 64 in the bar 50 (shown in dash line in FIG. 5). Also, it will be readily apparent that the brackets 66 can be moved or slid adjustably along the bar 50 and the bolts 72 tightened and therefore, the horizontal position or the spacing between the planter discs 32 is adjusted.

Therefore, I have achieved the objectives of having the planter discs 32 adjustable both as to spacing between them and as to the preferred elevation at which they run.

Although to a certain degree, it would be possible to have the seeders 38 at fixed locations and to adjust between the seeders 68 and the planter discs 32 by the flexibility of the chutes 36, it will be understood that it would be much more desirable if the position of the seeders 38 were also adjustable.

Making the location of the housing 40 of the seeders adjustable within the seed box 22 is achieved by cutting an elongated slot 76 in the bottom 26 of the seed box 22. Therefore, the housing 40 is attached at the desired location, roughly above the planter discs 32 and clamped in place by bolts 78 which extend through ears in the seeder housing 40 and clamped by washers to the bottom 26 of the seed boxes 22. The opening between the housings 40 is filled by sheet metal fillers 80. These may be clamped in place by any convenient means.

However, as described above, the rate of seed planting is dependent upon the accurate spacing and adjustment of the discs 42 within the housing 40. Therefore, when the housing 40 is adjusted, it is necessary to adjust the discs 42 longitudinally upon the shaft 44. The discs 42 are rotated by the shaft 44 by having the shaft non-round, specifically a square shaft, and having a hole through the disc 42 which is of similar shape to the shaft 44, namely, square. The disc 42 is spaced on the shaft 44 by placing collar 82 on either side of the disc 42 and fixing the position of the collar 82 to the discs by set screws 84. Other clamp means similar to chucks may be used to adjustably clamp the disc upon the shaft 44.

Normally the discs 42 are set after the housings 40 are clamped into position. The shaft 44 is moved so it is in the position for planting no seed. Then all of the discs 42 are moved to a position where they are flush against the housing 40 wall; therefore, having minimum or zero seed opening. Then with the shaft 44 and the discs 42 in this position, the collars 82 are moved against the discs 42 and the set screws 84 tightened.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In an agricultural planter having
   a. an elongated frame,
   b. said frame including elongated, horizontal beams extending substantially the entire length of the frame,
   c. means attached to the frame for attaching said frame to a draft vehicle,
   d. an elongated seed box mounted on said frame,
   e. said elongated seed box extending along said frame,
   g. a plurality of seeders attached to the bottom of said seed box,
   h. chutes extending from said seeders to a plurality of planting discs,
   j. The improvement comprising in combination with the above:
   k. a bar extending substantially the full length of said frame,
   m. said bar horizontal and attached to said frame below the forward position thereof,
   n. brackets attached to said bar,
   o. said bar including structural means for clamping said brackets to said bar for longitudinal adjustment therealong,
   p. arms pivoted to said brackets, and
   q. said planter discs attached to the rear end of said arms,
   r. said seed box having an elongated slot therein,
   s. said seeders clamped to said box along said slot, and
   t. spacers within the elongated slot between said seeders in said box.

2. In an agricultural planter having
   a. an elongated frame,
   b. said frame including elongated, horizontal beams extending substantially the entire length of the frame,
   c. means attached to the frame for attaching said frame to a draft vehicle,
   d. an elongated seed box mounted on said frame,
   e. said elongated seed box entending along said frame,
   g. a plurality of seeders attached to the bottom of siad seed box,
   h. chutes extending from said seeders to a plurality of planting discs,
   j. THE IMPROVEMENT COMPRISING IN COMBINATION WITH THE ABOVE:
   k. a bar extending substantially the full length of said frame,
   m. said bar horizontal and attached to said frame below the forward position thereof,
   n. brackets attached to said bar,
   o. said bar including structural means for clamping said brackets to said bar for longitudinal adjustment therealong,
   p. arms pivoted to said brackets, and
   q. said planter discs attached to the rear end of said arms,
   r. means for attaching said arms to said brackets in either an elevated position or a depressed position.

3. In an agricultural planter having
   a. an elongated frame,
   b. said frame including elongated, horizontal beams extending substantially the entire length of the frame,
   c. means attached to the frame for attaching said frame to a draft vehicle,
   d. an elongated seed box mounted on said frame,
   e. said elongated seed box extending along said frame,
   g. a plurality of seeder means for metering and dispensing seed attached to the bottom of said seed box,
   h. chutes extending from said seeders to a plurality of planting discs.
   j. The improvement comprising in combination with the above:
   k. a bar extending substantially the full length of said frame,
   m. said bar horizontal and attached to said frame below the forward portion thereof,
   n. brackets attached to said bar,
   p. arms pivoted to said brackets, and
   q. said planter discs attached to the rear end of said arms,
   r. said bar having an elongated horizontal slot therein extending substantially the full length of said bar, and
   s. said brackets having bolts which extend through said slot, whereby said brackets are clamped to said bar, whereby said brackets are longitudinally adjustable therealong.

4. The invention as defined in claim 3 with an additional limitation of
   t. means for attaching said arms to said brackets in either an elevated position or a depressed position.

5. The invention as defined in claim 4 with additional limitations of u. said seed box having an elongated slot therein,
v. said seeders clamped to said box along said slot, and
w. spacers between said seeders in said box.

6. In a machine as defined in claim 5 above, wherein x. a longitudinal shaft is journaled below said box for rotation,
y. each said seeder having a disc, said seeder disc attached to said shaft,
z. said shaft being non-round,
aa. The additional limitations comprising:
bb. said disc slidable axially along said shaft,
cc. means for clamping said disc securely to said shaft at selected positions.

7. The invention as defined in claim 6 with an additional limitation of
dd. means interconnecting the shaft and the frame for adjusting said shaft longitudinally.

* * * * *